United States Patent [19]
Kim et al.

[11] Patent Number: 5,982,751
[45] Date of Patent: Nov. 9, 1999

[54] RARE PROBABILITY CONNECTION CALL REGISTRATION METHOD USING PAYLOAD TYPE INDICATION FIELD INFORMATION FOR ASYNCHRONOUS TRANSFER MODE SWITCHING SYSTEM

[75] Inventors: Chul Soo Kim; Sun Mi Kim; Kyung Chul Shin, all of Daejeon, Rep. of Korea

[73] Assignee: Electronics and Telecommunications Research Institute, Daejeon, Rep. of Korea

[21] Appl. No.: 08/762,831

[22] Filed: Dec. 10, 1996

[30] Foreign Application Priority Data

Sep. 3, 1996 [KR] Rep. of Korea ............... 96-38096

[51] Int. Cl.⁶ .................................................. H04J 3/14
[52] U.S. Cl. ..................... 370/235; 370/244; 370/250; 370/396
[58] Field of Search ................................. 370/229, 230, 370/231, 232, 235, 236, 244, 252, 395, 396, 522, 250

[56] References Cited

U.S. PATENT DOCUMENTS 5,694,390  12/1997  Yamato et al. ............... 370/230
5,699,345  12/1997  Watanuki et al. ............ 370/235
5,726,977  3/1998   Lee .............................. 370/235

*Primary Examiner*—Chi H. Pham
*Assistant Examiner*—Ricky Ngo
*Attorney, Agent, or Firm*—Antonelli, Terry, Stout & Kraus, LLP

[57] ABSTRACT

An improved rare probability connection call registration method using a PTI field information for an asynchronous transfer mode switching system which is capable of registering a rare probability connection code (RPCC) by using PTI field information, which includes the steps of setting a predetermined threshold value, checking payload type indication field information within each cell header which is currently being serviced, and determining whether the cell experienced congestion, continuously checking other cells when the cell did not experience congestion, increasing the congestion experienced counter value with respect to the service when the cell experienced congestion, and comparing the congestion experienced counter value with a predetermined threshold value within a previously designated unit time, clearing the congestion experienced counter value when the congestion experienced counter value is less than a predetermined threshold value within the previously designated unit time, increasing the congestion experienced counter value when the congestion experienced counter value exceeds the predetermined threshold value within a previously designated unit time, and comparing the congestion counter value with a predetermined threshold value within the previously designated unit time.

1 Claim, 6 Drawing Sheets

FIG. 3

| PTI CODE | DESCRIPTION | KINDS |
|---|---|---|
| 000 | USER DATA CELL, CONGESTION NON-EXPERIENCE | USER CELL |
| 001 | | |
| 010 | USER DATA CELL, CONGESTION EXPERIENCE | |
| 011 | | |
| 100 | SEGMENT OAM F5 FLOW CELL | CELL EXCEPT FOR USER CELL |
| 101 | END-TO-END OAM F5 FLOW CELL | |
| 110 | RESOURCE MANAGEMENT CELL | |
| 111 | CAUDIDATE OF FUTURE REFERENCE FUNCTION | |

RARE PROBABILITY CONNECTION CALL REGISTRATION METHOD USING PAYLOAD TYPE INDICATION FIELD INFORMATION FOR ASYNCHRONOUS TRANSFER MODE SWITCHING SYSTEM

BACKGROUND OF THE INVENTION

1. Field of the Invention

The present invention relates to a rare probability connection call registration method using payload type indication (PTI) field information for an asynchronous transfer mode (ATM) switching system, and in particular to an improved rare probability connection call registration method using PTI field information for an ATM switching system which is capable of registering a rare probability connection call (RPCC) by using PTI field information which indicates the congestion of the switching component within the cell header, whereby it is possible to more quickly control the network and restrict an ineffective call, thus maximizing the efficiency of the network.

2. Description of the Conventional Art

Most traffic congestion of a communication network occurs due to an overload in a receiving system. This communication congestion or the overload of the switching system occurs due to natural disasters, an overload phenomenon of the system when a multitude of call services are requested at one time, or communication traffic concentrated on a specific receiving system due to an unexpected communication failure.

When calls are concentrated at a predetermined time with respect to a specific receiving system (for example, reservations for a public performance, or the audience rating response to a television program), the above-described heavy call concentration phenomenon may occur even though an operator of the switching system predicts such heavy call congestion if special operations on the system are not made.

When call requests are heavily concentrated on a predetermined receiving number, that is when many calls are concentrated at one time on the destination number beyond the design specification of the connection admission control function, the system can only offer limited service, and the system may go down due to the above-described problems.

FIG. 4 is a graph illustrating a performance variation when a switching system is overloaded.

As shown therein, the curved line indicates a theoretical system performance which is obtainable when an overload of the system or traffic congestion occurs, and the curved line "c" denotes system performance when the congestion control function is not operated, and the curved line "b" denotes affordable system performance when the congestion control function is operated.

If the above-described situation is continuously maintained, the system congestion resulting from many call attempts to a specific number may cause further congestion with respect to the neighboring system. So, finally, there is the possibility of system-wide failure.

In order to overcome the above-described problems, a conventional public switched telephone network (PSTN) is directed to check a traffic completion ratio with respect to a candidate code (traffic received in a specific code of a predetermined system) that the operation input, and when a call completion ratio of a corresponding code is less than a predetermined threshold value, the call with respect to the corresponding code is controlled.

Such, method is directed to maximizing the efficiency of the network so that system resources may be evenly distributed for a call except for a congested call by detecting a receiving code for which the call completion ratio is lower than that of a normal call, and controlling the receiving code in a transmitter for which a desired call attempt is possible or the switching system near a transmitting terminal. A call for which the completion ratio is lower than that of a normal call is called a rare probability of a connection call (RPCC).

In the case of the conventional PSTN, control with respect to the code in which the call completion ratio is significantly lower due to the congestion of a specific switching system is performed based on a result of the statistic function after a lapse of a predetermined time after the congestion occurred, so that a large amount of time is required for performing the control, and since the call completion ratio is controlled only by statistic data, if faults in the statistic function error occurs, an error may occur in the system.

In addition, when performing a function based on the candidate code, since the control is performed after a predetermined time after the operator inputs a predetermined code has elapsed, it is impossible to prevent call concentration problems due to an unpredictable and sudden failure of the system in conventional methods.

SUMMARY OF THE INVENTION

Accordingly, it is an object of the present invention to provide an improved rare probability connection call registration method using a payload type indication (PTI) field information for an asynchronous transfer mode (ATM) switching system which overcomes the problems encountered in the conventional art.

It is another object of the present invention to provide an improved rare probability connection call registration method using a PTI field information for an asynchronous transfer mode (ATM) switching system which is capable of registering a rare probability connection code (RPCC) by using PTI field information which indicates the congestion of the switching component within the cell header which is serviced to the corresponding route, whereby it is possible to more quickly control the network and restrict an ineffective call, to thus maximizing the efficiency of the network.

To achieve the above objects, there is provided an improved rare probability connection call registration method using payload type indication field information for an asynchronous transfer mode switching system which includes the steps of setting a predetermined threshold value, checking payload type indication field information within each cell header which is currently being serviced, and determining whether the cell experienced congestion, continuously checking other cells when the cell did not experience congestion, increasing the congestion experienced counter value with respect to the service when the cell experienced the congestion, comparing the congestion experienced counter value with a predetermined threshold value within a previously designated unit time, clearing the congestion experienced counter value when the congestion experienced counter value is below a predetermined threshold value within the previously designated unit time, increasing the congestion experienced counter value when the congestion experienced counter value exceeds a predetermined threshold value within a previously designated unit time, comparing the congestion counter value with a predetermined threshold value within the previously designated unit time, registering the corresponding code as a rare probability connection code when the congestion counter value exceeds the predetermined threshold value within the previously designated unit time, outputting the corresponding code to an operator through an operator terminal, requesting control with respect to routing to the corresponding route, and clearing the congestion counter value when the congestion counter value is below predetermined threshold value within the previously designated unit time.

Additional advantages, objects and other features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The present invention will become more fully understood from the detailed description given hereinbelow and the accompanying drawings which are given by way of illustration only, and thus do not limit of the present invention, and wherein:

FIG. 3 is a table illustrating the contents based on a coding state of a PTI field according to the present invention;

DETAILED DESCRIPTION OF THE INVENTION

Figure 1:
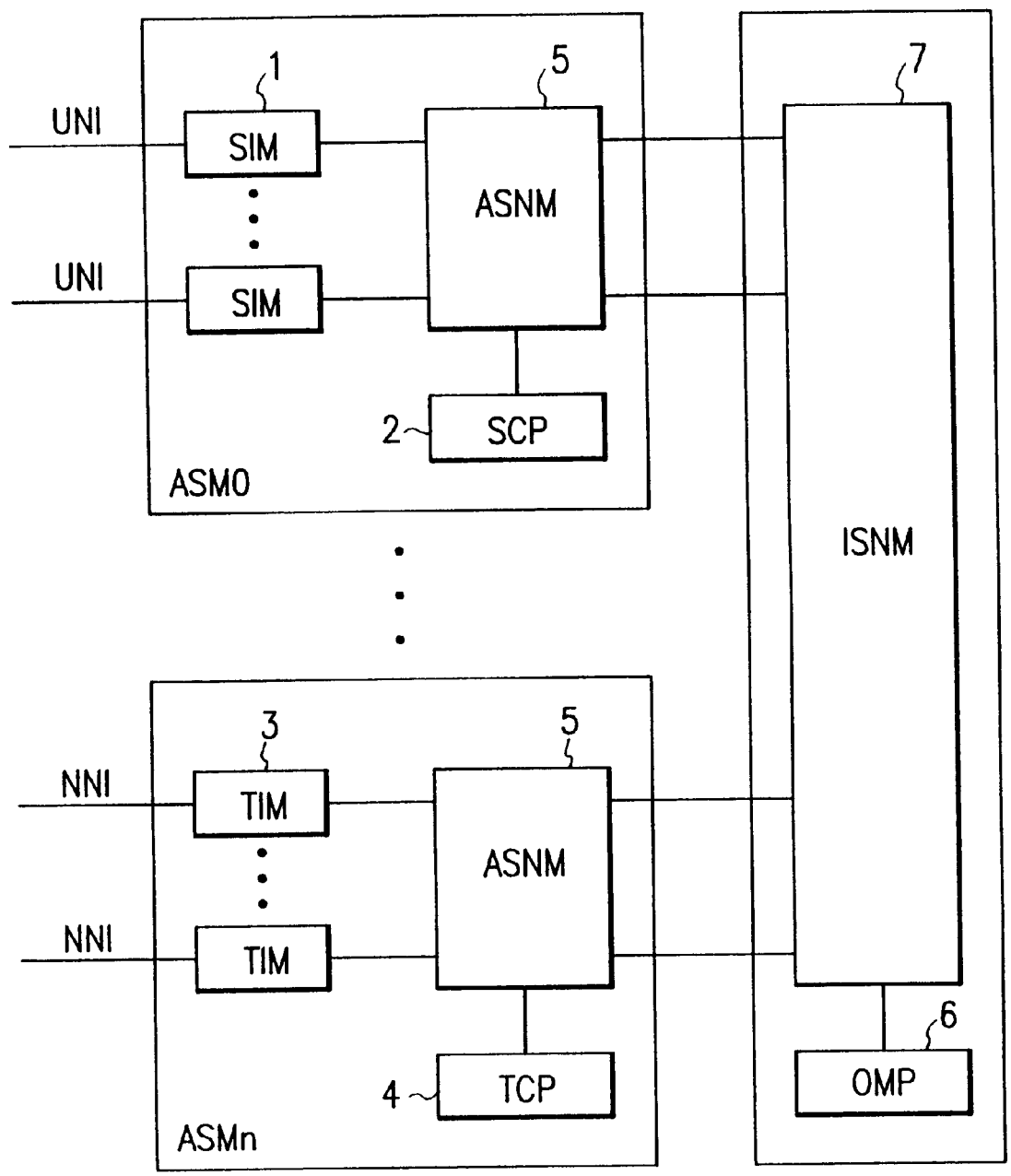
FIG. 1 is a block diagram illustrating an asynchronous transfer mode (ATM) switching system according to the present invention.

FIG. 1 is a block diagram illustrating an asynchronous transfer mode (ATM) switching system according to the present invention.

As shown therein, a subscriber call processor (SCP) 2 is a processor for performing user's call which utilizes a user network interface (UNI) protocol and controls an entire traffic operation such as a call receiving control, and a usage parameter control (UPC) in cooperation with a subscriber interface module (SIM) 1.

A trunk call processor (TCP) 4 is a processor for performing a call process with a network using a network node interface (NNI) protocol, performing a call connection control with respect to an input relay and output relay call in cooperation with a trunk interface module (TIM) 3, and controlling all functions which are necessary for an interface match with the network.

An operation and maintenance processor (OMP) 6 controls an operation- and maintenance-related function for the system, and a processor for performing a charging process, a statistic process, a maintenance, a management function, etc.

Access switch network module (ASNM) 5 is a self-routing switch in which there is no blocking in the switching system for transmitting a basic unit cell of the ATM, and which performs a line concentration function having a predetermined line concentration ratio in accordance with the configuration system.

An interconnection switch network module (ISNM) 7 is a self-routing switch which is used as an interconnector between ATM switching modules (ASM).

Figure 2A:
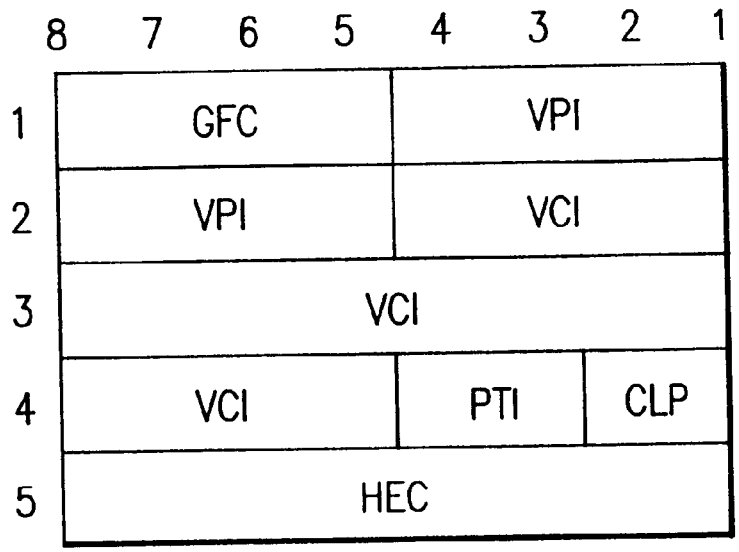
FIGS. 2A and 2B are views illustrating the construction of an ATM cell header.
Figure 2B:
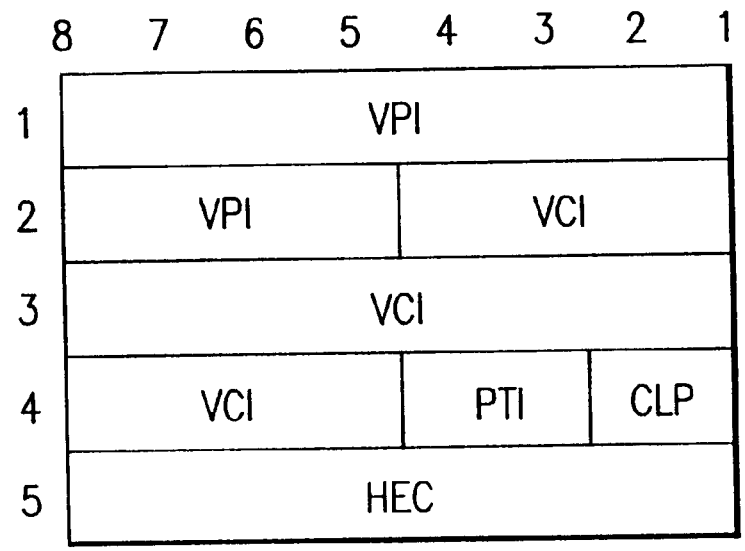
Figure 4:
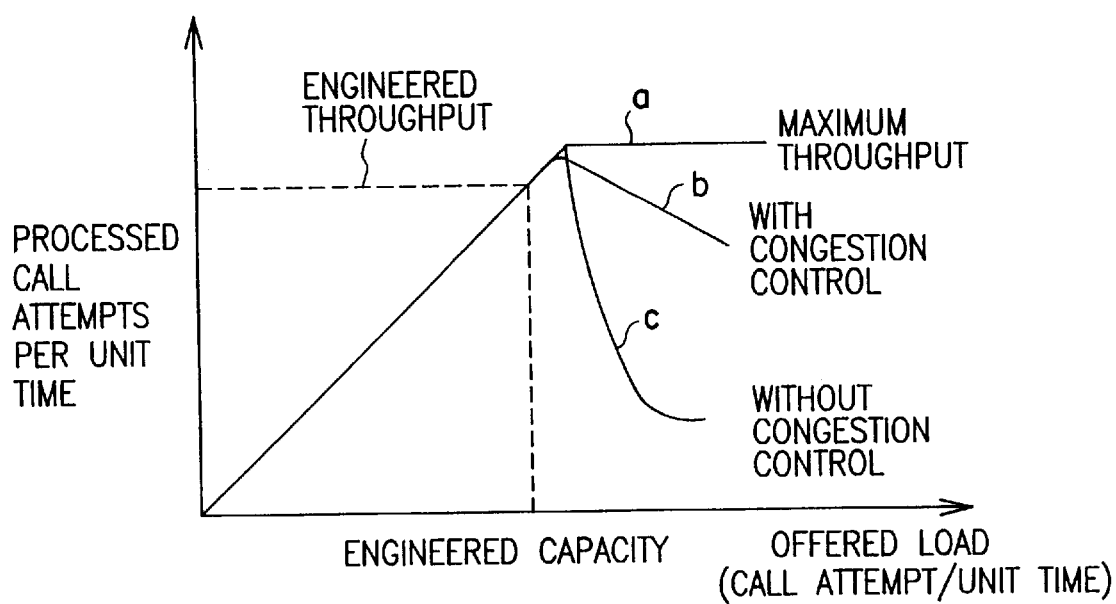
FIG. 4 is a graph illustrating performance variation when a switching system is overloaded.

FIGS. 2A and 2B are views illustrating the construction of an ATM cell header. FIG. 2A is a view illustrating the construction of a cell header of a user network interface (UNI), and FIG. 2B is a view illustrating the construction of a cell header of a network node interface (NNI).

The cell header of the UNI includes 4-bit generic flow control (GFC) which indicates the kind of cell, an 8-bit virtual path identifier (VPI) which indicates a virtual path, a 16-bit virtual channel identifier (VCI) which indicates a virtual channel, a 3-bit payload type identifier (PTI) which indicates a 1-bit payload, a cell loaded priority which indicates a load priority of a cell, and an 8-bit header error control (HEC) which indicates an error code of the header.

In addition, the cell header of the NNI does not have a GFC field, and the VPI field is 12-bits.

FIG. 3 is a table illustrating the contents based on a coding state of a PTI field according to the present invention.

Among methods for using information of the 3-bit PTI field of which indicates a payload type of a cell, a function of informing the congestion in a forward direction is called an explicit forward congestion indication (EFCN), and a function of informing a backward congestion is called an explicit backward congestion indication (EBCN).

It is possible to recover the failure state of the system by reducing the load of the switching component. Since normal service is impossible when the set ratio of the PTI field information which indicates the congestion of the switching component within a cell header which is serviced to the corresponding route exceeds a specific threshold value of the entire route, the connection to the call transmitting side or the switching system which is located nearest the call transmitting side which desires a routing to the corresponding route is rejected, and it is possible to overcome the failure by reducing the number of ineffective calls within the network and automatically recovering the load of the corresponding switching components.

As shown in FIG. 3, the PTI field changes the PTI field value of the entire cell header which passes through the switching components when congestion occurs in the switching components during the call service. That is, when the terminal of the call transmitting side transmits a cell, the PTI field value is transmitted in the form of "000", and when congestion occurs in a specific switching component, the switching component sets the PTI field value as "010" or "011", and the set value is not changed by the switching component.

Therefore, it is possible to accurately determine that the call delayed to the corresponding route is related to the RPCC when the ratio of the congestion by the switching component, the ratio being changed from the PTI value, exceeds the threshold value that the system designated, thus performing call control.

Figure 5:
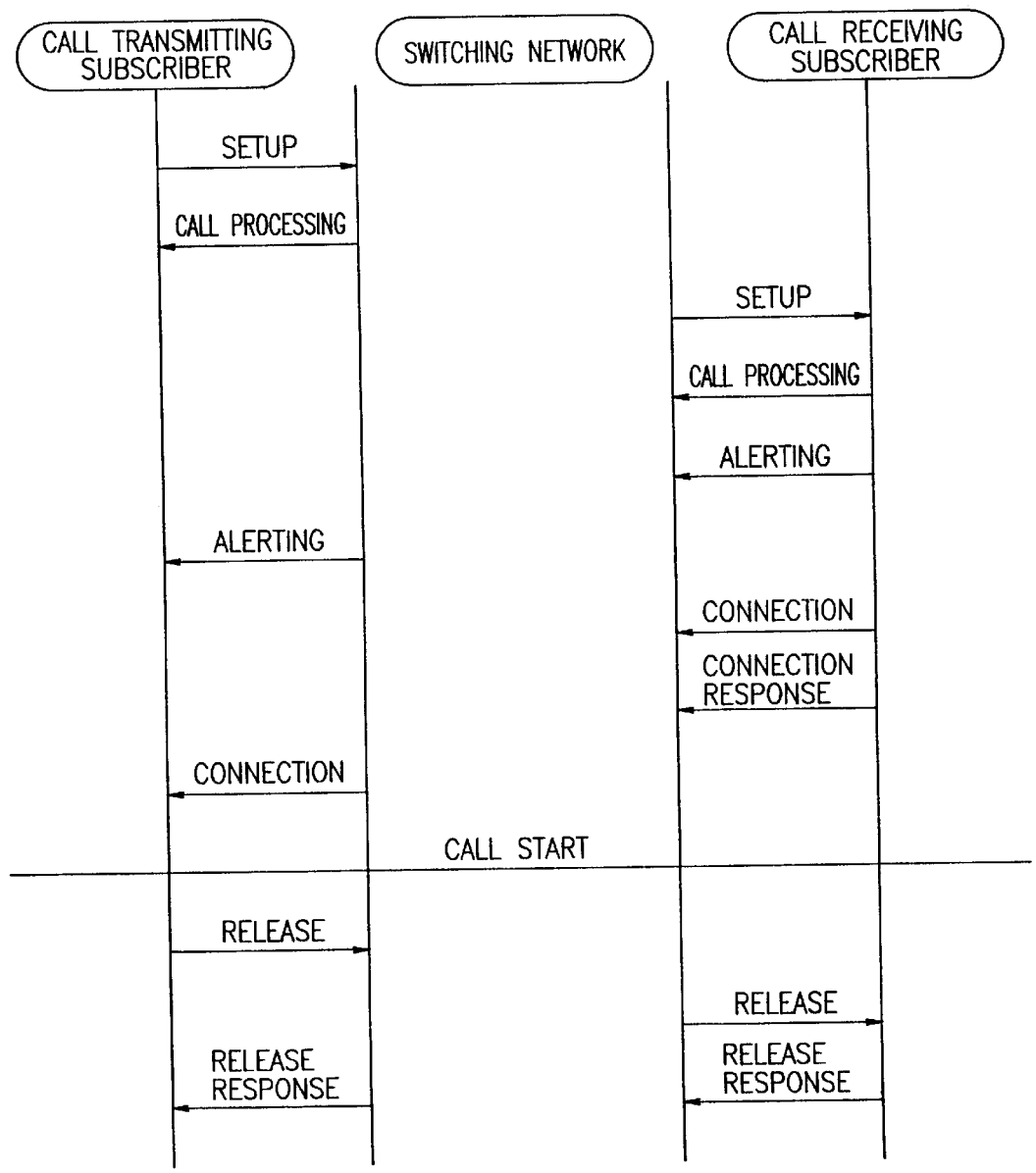
FIG. 5 is a view illustrating a process of a call service request for a broad integrated service digital network (B-ISDN) according to the present invention.

FIG. 5 is a view illustrating a process of a call service request for a broad integrated service digital network (B-ISDN) according to the present invention.

When the setup message is transmitted to the switching system during a call request to the local subscriber, and when the request bandwidth exists with respect to the call receiving number which the subscriber wants, the call process message is transmitted to the subscriber.

The setup message is transmitted to the destination subscriber (a call receiving subscriber) through the delay unit, and the destination subscriber transmits an alerting message when the attribute thereof is identical to the call transmitting subscriber, and when the connection and the connection response message are present, the service is initiated.

In addition, when the receiving operation is terminated, or when the call transmitting subscriber terminates the call, the release message is transmitted.

Here, the network manager or the subscriber can transmit the release message any time after the setup message. Therefore, it is possible to terminate the call during the connection by the subscriber or the call operation at the network side when the call request by the subscriber is not considered.

Figure 6:
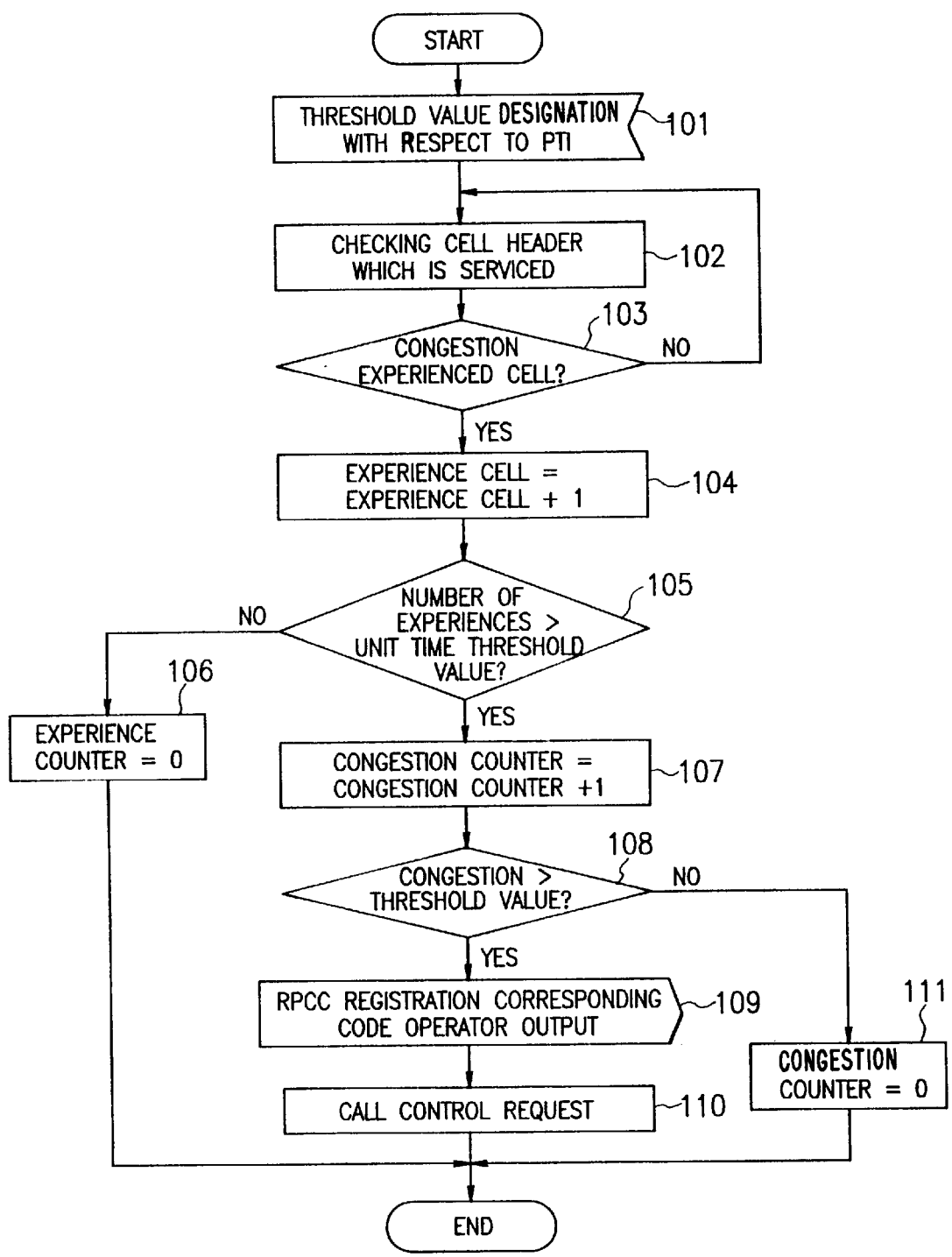
FIG. 6 is a flow chart illustrating a rare probability connection call (RPCC) registration method according to the present invention.

FIG. 6 is a flow chart illustrating a rare probability connection call (RPCC) registration method according to the present invention.

The threshold value that the system previously designated or the threshold value that the operation set up are received, and a predetermined threshold value is set up in step 101. In addition, the PTI field information in each cell header which is currently serviced is checked in step 102, and it is determined whether the cell has experienced congestion in step 103.

If the cell has not experienced the congestion, other cells are checked continuously, and if the cell has experienced congestion, the congestion experienced counter value with respect to the service is increased by "1" in step 104, and it is determined whether the value of the congestion experienced counter is greater than a predetermined threshold value within a designated unit time in step 105.

If the congestion experienced counter value is below a predetermined threshold value within the designated unit time, the congestion experienced counter value is cleared in step 106, and if the congestion experienced counter value exceeds a predetermined threshold value within the previously designated unit time, the congestion counter value is increased by "1" in step 107, and it is determined that the congestion counter value is greater than a predetermined unit time within the previously designated unit time in step 108.

If the congestion counter value exceeds a predetermined threshold value within the previously designated unit time, the corresponding code is registered as the RPCC, and is output to the operator through the operator terminal in step 109, and the call request is to be routed to the corresponding route in step 110.

If the congestion counter value is below a predetermined threshold value within the previously designated unit time, the congestion counter value is cleared in step 111, and the service is continuously checked.

As described above, the rare probability connection call registration method using a payload type indication field information for an asynchronous transfer mode switching system according to the present invention is directed to registering the RPCC by using PTI field information which indicates the congestion of the switching component within the cell header which is serviced to the corresponding route, whereby it is possible to more quickly control the network and restrict the ineffective call. In addition, it is possible to limit ineffective calls within a predetermined network by limiting the call service request toward the corresponding switching system at the transmitting side or the switching system which is located nearest from the transmitting side when a failure which the operator cannot predict occurs, thus maximizing the efficiency of the network.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. A rare probability connection call registration method using a payload type indication field information for an asynchronous transfer mode switching system, said method comprising the steps of:

setting a predetermined threshold value, checking payload type indication field information within each cell header which is currently being serviced, and determining whether the cell experienced congestion;

continuously checking other cells when the cell did not experience congestion, increasing a congestion experience counter value with respect to the service when the cell experienced the congestion, and comparing the congestion experience counter value with a predetermined threshold value within a previously designated unit time;

clearing the congestion experienced counter value when the congestion experienced counter value is less than a predetermined threshold value within the previously designated unit time, increasing the congestion experience counter value when the congestion experience counter value exceeds the predetermined threshold value within the previously designated unit time, and comparing the congestion counter value with the predetermined threshold value within a previously designated unit time;

registering a corresponding code as a rare probability connection code when the congestion counter value exceeds the predetermined threshold value within the previously designated unit time, outputting the corresponding code to an operator through an operator terminal, and requesting control with respect to a corresponding route; and clearing the congestion counter value when the congestion counter value is less than the predetermined threshold value within the previously designated unit time.

* * * * *

UNITED STATES PATENT AND TRADEMARK OFFICE
CERTIFICATE OF CORRECTION

PATENT NO : 5,982,751
DATED : November 9, 1999
INVENTOR(S) : Chul Soo KIM ET AL.

It is certified that error appears in the above-identified patent and that said Letters Patent is hereby corrected as shown below:

-- Electronics and Telecommunications Research Institute of Daejeon, Rep. of Korea and Korea Telecommunication Authority of Seoul, Rep. of Korea. --

Signed and Sealed this

Twenty-sixth Day of December, 2000

Attest:

Q. TODD DICKINSON

Attesting Officer

Director of Patents and Trademarks